(12) United States Patent
Yahav

(10) Patent No.: US 7,852,461 B2
(45) Date of Patent: Dec. 14, 2010

(54) DUAL MODE DEPTH IMAGING

(75) Inventor: Giora Yahav, Haifa (IL)

(73) Assignee: Microsoft International Holdings B.V., Amsterdam (NL)

( * ) Notice: Subject to any disclaimer, the term of this patent is extended or adjusted under 35 U.S.C. 154(b) by 482 days.

(21) Appl. No.: 11/984,250

(22) Filed: Nov. 15, 2007

(65) Prior Publication Data

US 2009/0128833 A1    May 21, 2009

(51) Int. Cl.
*G01C 3/08* (2006.01)
(52) U.S. Cl. ............... 356/3.08; 356/3.01; 356/3.05; 356/3.1; 356/4.01; 356/4.1
(58) Field of Classification Search ........ 356/3.01–28.5
See application file for complete search history.

(56) References Cited

U.S. PATENT DOCUMENTS

| 6,137,566 | A  * | 10/2000 | Leonard et al. | ......... | 356/141.1 |
| 2003/0035100 | A1 * | 2/2003 | Dimsdale et al. | ............ | 356/124 |
| 2009/0073419 | A1 * | 3/2009 | Gesner et al. | ................. | 356/73 |

OTHER PUBLICATIONS

International Search Report PCT/IL2008/001506, dated Apr. 29, 2009.
Klaus-Dieter Kunhert et al: "Fusion of Stereo-Camera and PMD-Camera Data for Real-Time Suited Precise 3D Environment Reconstruction"; Intelligent Robots and Systems, 2006 IEEE/RSJ International Conferemce on, IEEE PI, Oct. 1, 2006, pp. 4780-4785.

* cited by examiner

*Primary Examiner*—Thomas H Tarcza
*Assistant Examiner*—Luke D Ratcliffe
(74) *Attorney, Agent, or Firm*—Vierra Magen Marcus & DeNiro LLP

(57) ABSTRACT

Dual mode depth imaging system and method is provided, the system comprising a first and second image sensors and a processor able to switch between a first mode of depth imaging and a second mode of depth imaging according to at least one predefined threshold. The method comprising providing depth sensing by Time of Flight if the distance of the sensed object from the camera is not below a first threshold and/or if a depth resolution above a second threshold is not required, and providing depth sensing by triangulation, if the distance of the sensed object from the camera is below the first threshold and/or if a depth resolution above the second threshold is required.

16 Claims, 5 Drawing Sheets

DUAL MODE DEPTH IMAGING

BACKGROUND OF THE INVENTION

There are two leading methods for producing three dimensional images. One method use triangulation. The other method is based on Time-of-Flight measurements.

Triangulation is any kind of distance calculation based on given lengths and angles, using trigonometric relations.

Triangulation with two parallel cameras, or stereo triangulation, may be performed based on parameters like, for example, distance between the cameras, focal length of the cameras, spatial angles of the Line-of-Sight (LOS) from the imaged object to each camera and/or other suitable parameters. This kind of triangulation is sometimes called "Passive Triangulation". This kind of triangulation may require additional means to determine which points in the images received by the two cameras correspond to the same actual point.

Other form of triangulation may require at least one camera and a light source which may create a pattern on the object or alternatively scan the object angle by angle with a stripe of radiation. The calculation may base on the spatial angle of the LOS from the imaged object to the camera, for each scanning angle. This kind of triangulation is sometimes called "Active Triangulation".

In the method based on the Time-Of-Flight (TOF) principle, the depth information may be captured by emitting pulses of radiation to all objects in the scene and sensing the reflected light from the detected objects. The pulses of radiation may be obtained by switching the radiation source on and off. All objects in the scene may then be arranged in layers according to the amount of radiation sensed by the depth pixels in the camera in each pulse period, which may be translated to distance information, providing the depth information in real time as standard black and white video where the grey-level correlates to relative distance. In this method, color data may be provided, for example, by using a normal color imaging sensor.

TOF depth sensors may also be based on detection of phase shift in the radiation reflected from the detected objects. The radiation pulses may be given a signal shape with a frequency, for example, a square wave or a sinusoidal wave. The light reflected from the object arrives at the sensor with a phase shift. The phase shift of the radiation signal shape as received at the sensor may be measured, and the distance between the object and the sensor can be calculated there from. In this method, the distances to objects differing by 360 degrees of phase shift may not be distinguishable. It is possible to overcome this shortcoming by using multiple frequencies in the radiation signal.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
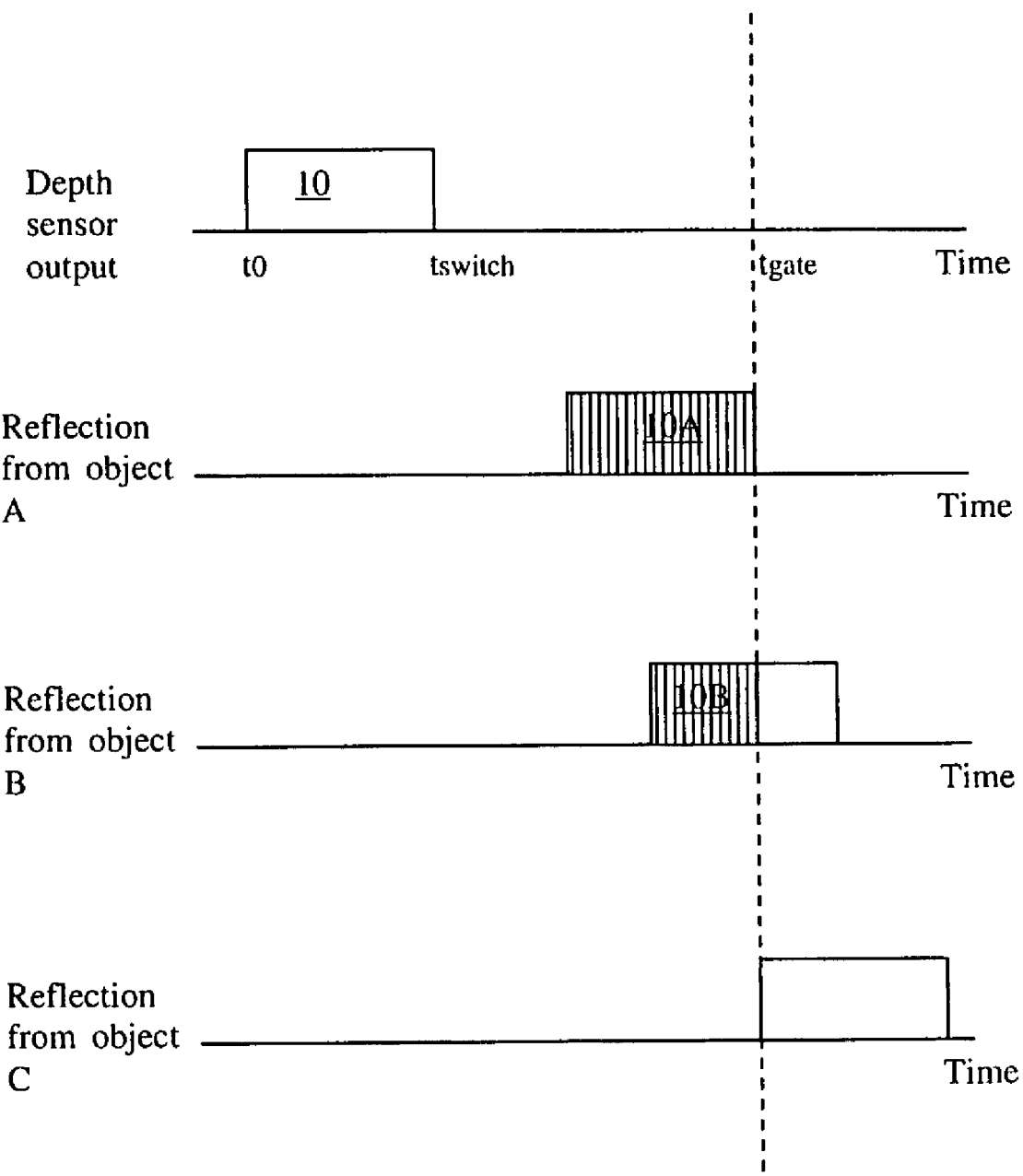
FIG. 1 is a schematic diagram illustrating TOF depth sensing according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Depth imaging by triangulation may not be suitable when real-time and continuous imaging is required. For example, in passive triangulation, in order to ensure that the data of the spatial angle in both cameras relate to the same point on the object, several means of image matching may be used. The image matching process and the triangulation calculation may be substantially prolonged. In active triangulation, scanning of the object angle by angle may be needed and may make this process long and complicated. Depth imaging by TOF measurements, using frequent pulses of radiation, may be relatively quick and continuous. The present invention may provide dual mode depth imaging which may benefit from the advantages of both triangulation depth imaging and TOF depth imaging.

Reference is made to FIG. 1, which is a schematic diagram illustrating TOF depth sensing according to some embodiments of the present invention. A light source (for example as described below with reference to FIGS. 5A, 5B and 6) may be turned on at t0. A light wall 10 may be created by switching the light off at tswitch. Light wall 10 may be emitted towards, for example, an object A, an object B and a object C. Object A, for example, may be closer to the light source than object B and object C. The light may be reflected from object A and/or object B and/or object C towards a light sensor (for example as described below with reference to FIGS. 5A, 5B and 6). At time tgate the light sensor may be gated to cease absorbing the light reflected from object A and/or object B and/or object C. The gating may be performed by physically blocking the light by, for example, a shutter. Alternatively, the light sensor may be predefined to stop absorbing light after a predetermined time. Until time tgate, the light sensor may absorb, for example, an amount of reflected light 10A reflected from object A and/or an amount of reflected light 10B reflected from object B.

Therefore, the distance of an object from the light sensor may be deduced from the amount of reflected light absorbed by the light sensor until time tgate. Since different objects may have different reflectivity, the amount of absorbed radiation may have to be normalized by the total reflected radiation in order to calculate the actual distance.

The light reflected from object A may all be absorbed by the light sensor before tgate, annotated by 10A. The light sensor and the light source may be units of the same camera (not shown). In order that all the light emitted on object A may be absorbed by the light sensor before tgate, the maximal distance of object A from the camera should be approximately equal to $c \cdot (tgate-tswitch)/2$, wherein c is the speed of light. The light sensor may absorb the same amount of light from all the objects located at distance $c \cdot (tgate-tswitch)/2$ or closer than that from the camera, and therefore these objects may be detected as located at the same distance from the camera.

Since object B is farther than object A, not all the light reflected from object B may be absorbed by the light sensor before tgate. Therefore, object B may be detected as located farther than object A. Object C may be located farther so that all the reflected light may reach the light sensor after tgate, and therefore none of the reflected light may be sensed by the light sensor. In order that none of the light reflected from object C may be sensed by the light sensor before tgate, the minimal distance of object C from the camera should be approximately equal to $c \cdot (tgate-tswitch)/2$, wherein c is the speed of light. All the objects located at $c \cdot (tgate-tswitch)/2$ or farther may not be detected by the light sensor.

Therefore, the switching time tswitch determines the width of the depth sensing range of the camera. Since every light sensor usually have a bit depth, e.g., a limited number of levels of gray which can be generated, the depth resolution may be determined, for example, by the width of the light wall divided by the bit depth of the light sensor. A narrower light wall may provide higher resolution, and on the other hand may decrease the width of the depth sensing range.

In case the TOF measurements rely upon phase shifts, the range of depth sensing may be limited by distances in which the phase shift reaches 360 degrees. The distances to objects differing by 360 degrees of phase shift may not be distinguishable.

The practical depth resolution limitation may be about 1 cm, which may be hardly recognizable by a user for imaging of relatively far objects, but may be significant in imaging of relatively close object, for example, in distance substantially smaller than 50 cm.

Additionally, as described above, the minimal distance of the object from the camera may be limited by the minimal possible gating time tgate, e.g. the minimal value of (tgate−tswitch). This may be determined by the mechanical or other characteristics of the components of the light sensor and the camera. The minimal distance of the object from the camera may be, for example, approximately 20 cm.

The depth imaging resolution obtained by triangulation may be much higher, limited mainly by the pixels resolution of the imager, and may be less than 1 mm or even a few micrometers. The maximal triangulation depth sensing range may be determined by the geometry of the system, for example, by the distance between the cameras. Distance of, for example, few millimeters between the cameras may obtain maximal depth sensing range of, for example, several tens of centimeters.

The maximal distance for depth sensing by TOF measurements may be determined by the radiation intensity returned from the object which should be high enough to be sensed by the camera sensor, passing the minimum required Signal to Noise Ratio (SNR). The maximal distance may substantially reach, for example, a few meters for a Field of View (FOV) of about 60 degrees.

Figure 2:
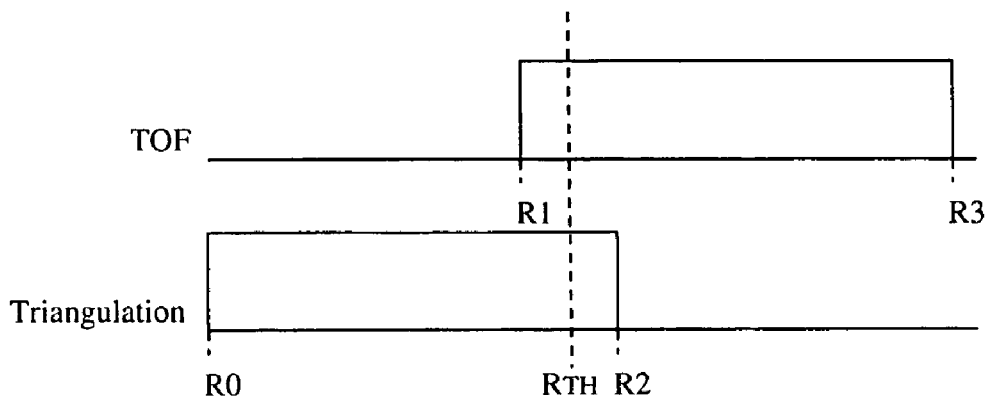
FIG. 2 is a schematic diagram illustrating the dynamic ranges of the TOF depth sensing and of the triangulation depth sensing according to some embodiments of the present invention.

Reference is now made to FIG. 2, which is a schematic diagram illustrating the dynamic ranges of the TOF depth sensing and of the triangulation depth sensing according to some embodiments of the present invention. The low limit R0 of the triangulation dynamic range may be, for example, about 1-2 cm and depend mainly on the geometry and the positions of the camera(s) and/or light source(s).

The high limit R2 of the triangulation dynamic range may be, for example, several tens of centimeters, as discussed above.

The low limit R1 of the TOF dynamic range may be, for example, about 10-20 cm, as discussed above.

The high limit R3 of the may be, for example, a few meters, as discussed above.

The present invention may provide a method enabling utilization of both the triangulation method and the TOF method, by using each of the methods in the suitable ranges and/or for the suitable purposes for each method. Therefore, a dual mode camera according to the present invention (as shown, for example, in FIG. 5A, 5B or 6) may enable expansion of the dynamic depth sensing range, to a range extending from less than one centimeter to a few meters. A dual mode camera according to the present invention may automatically switch between TOF depth sensing and triangulation depth sensing in real time according to, for example, the distance of the sensed object from the camera and/or the required resolution. For example, the dual mode camera may provide triangulation depth sensing when the distance of the object from the camera is shorter then a certain threshold, for example, RTH. RTH may be a value between R1 and R2, e.g., several tens of centimeters.

Different functions may require broad depth sensing range, which may extend, for example, from a few centimeters to a few meters. Some systems may require, for example, fast transition from imaging of far objects to imaging of close objects, for example, when an object comes close to the camera from a farther distance. Transition from imaging of far objects to imaging of close objects may be required, for example, in systems which may provide personalized adjustment to a user, security and/or secured systems, computer/video games and the like. For example, a security camera may sense a person from a distance, for example, by TOF, and when the person draws near the camera, the camera may switch to a near range type of imaging, for example, by triangulation. The triangulation imaging may provide, for example, Face Recognition of the person.

Figure 3:
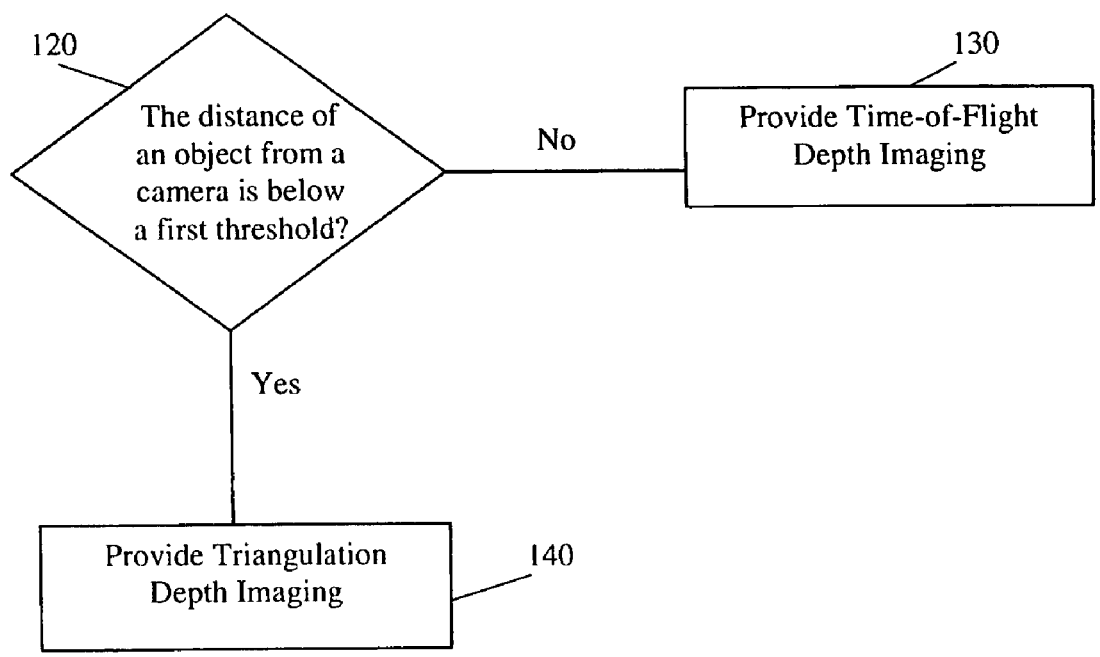
FIG. 3 is a flow chart illustrating a method for switching between two modes of a dual mode camera according to embodiments of the present invention.

Reference is now made to FIG. 3, which is a flow chart illustrating a method for switching between two modes of a dual mode camera according to embodiments of the present invention. As indicated in block 120, the distance of the sensed object from the camera may be checked to conclude whether it is below a first threshold, for example RTH, as described above with reference to FIG. 2. As indicated in block 130, if the distance of the sensed object from the camera is not below a first threshold, the camera may provide TOF depth sensing.

According to embodiments of the present inventions, TOF depth sensing is preferred over triangulation due to the speed of the TOF imaging as long as the requirements of a specific system and/or function are provided, for example, with regard to resolution and/or distance. Therefore, when the distance of the imaged objects from the camera is above few tens of centimeters, the camera may use TOF depth sensing.

As indicated in block 140, if the distance of the sensed object from the camera is below a first threshold, the camera may provide triangulation depth sensing.

The choice between TOF depth sensing and triangulation depth sensing may be made by a user which may switch between the imaging methods. For example, a dual mode depth imaging camera may provide a manual switching button (not shown in the drawings). In other embodiment, a user may switch between the methods by giving an order to a controller by a user interface.

Figure 5A:
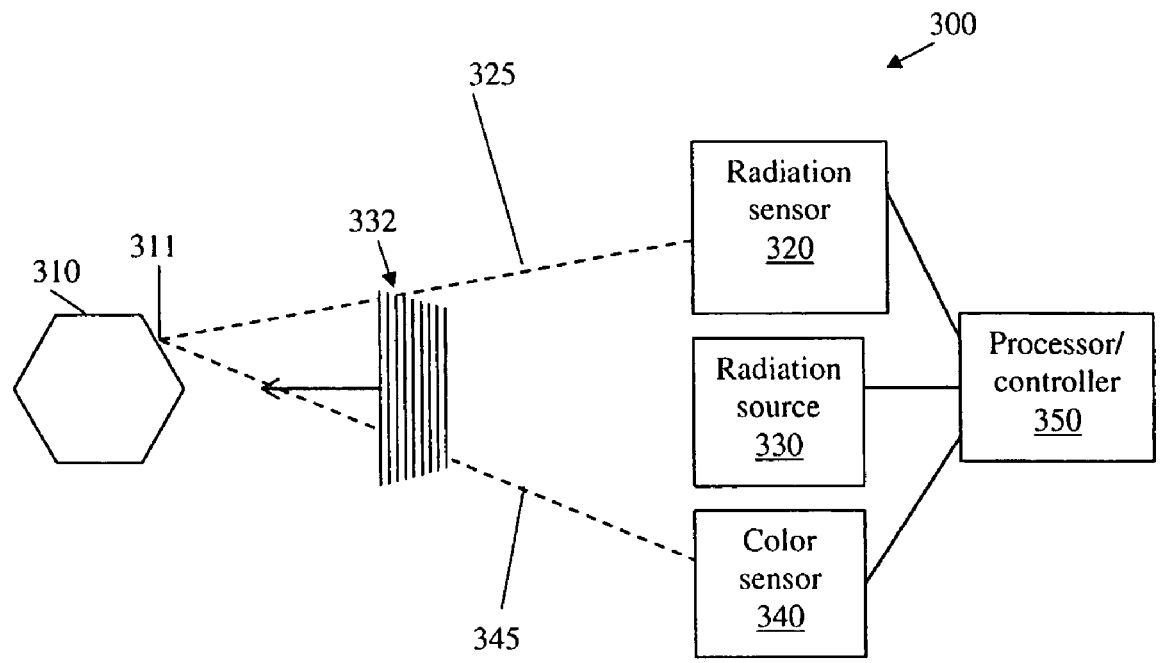
FIGS. 5A and 5B are schematic illustrations of a system for dual mode depth imaging according to some embodiments of the present invention.
Figure 5B:
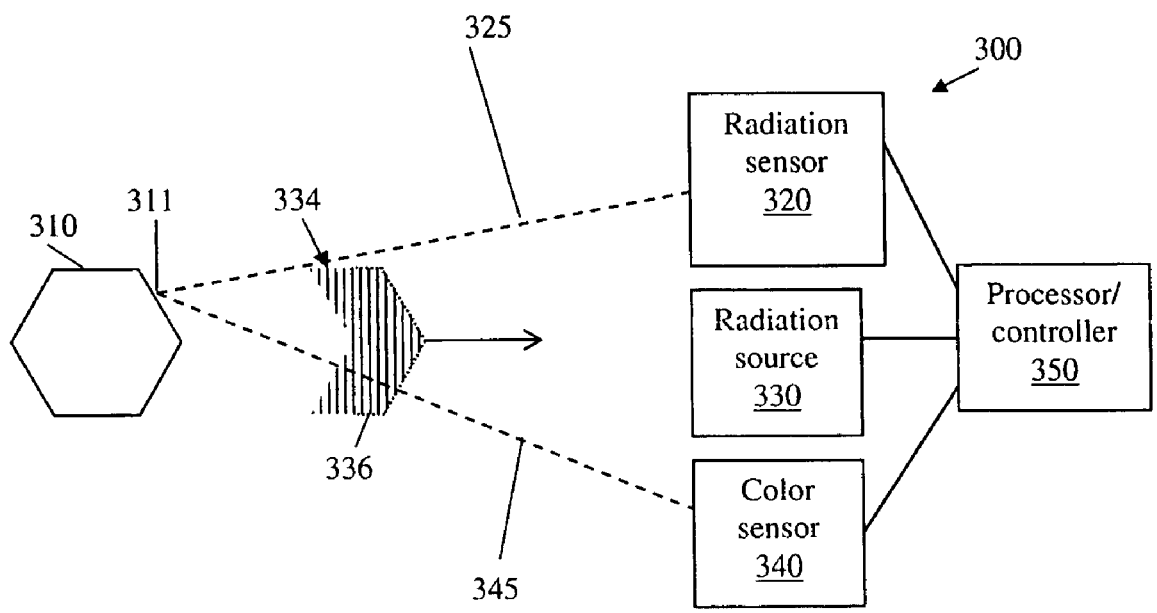
Figure 6:
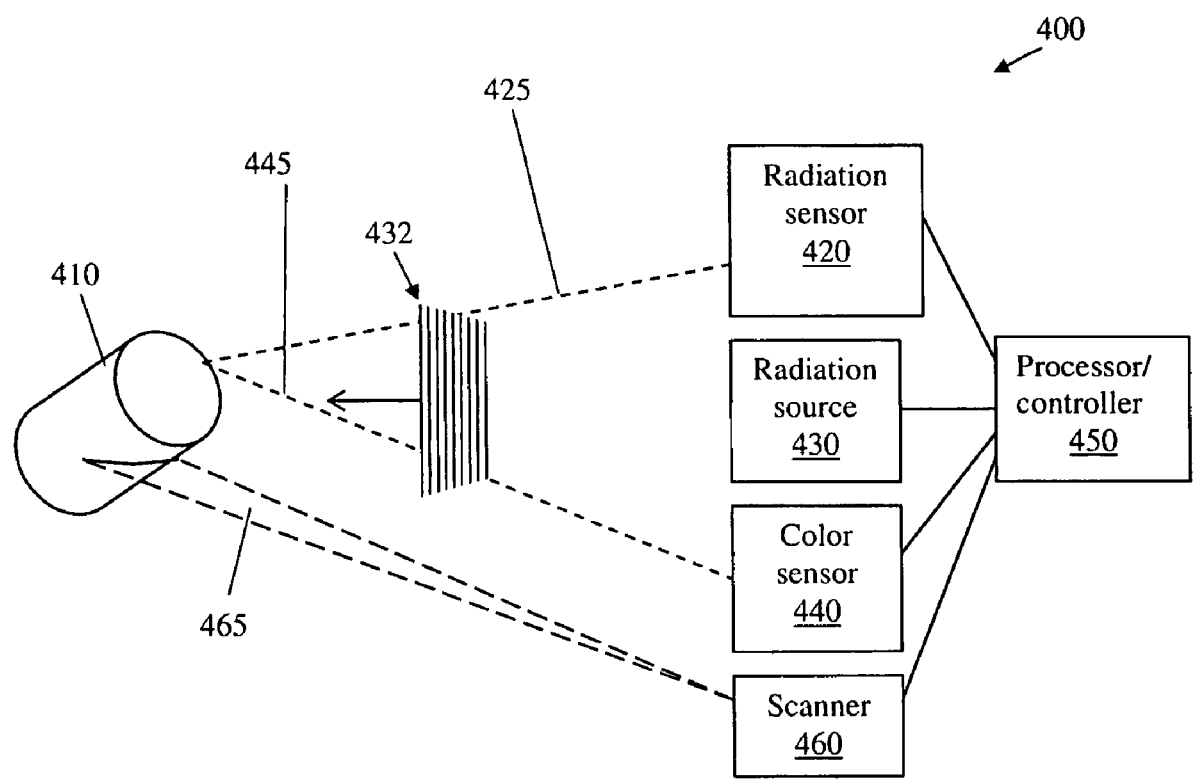
FIG. 6 is a schematic illustration of another system for dual mode depth imaging according to some embodiments of the present invention.

According to other embodiments of the present invention, the choice between TOF depth sensing and triangulation depth sensing may be made by a processor/controller (as shown in FIG. 5A, 5B or 6), which may choose a depth sensing method according to a predefined threshold of the distance of imaged objects from the camera, as described above with reference to FIG. 3.

Figure 4:
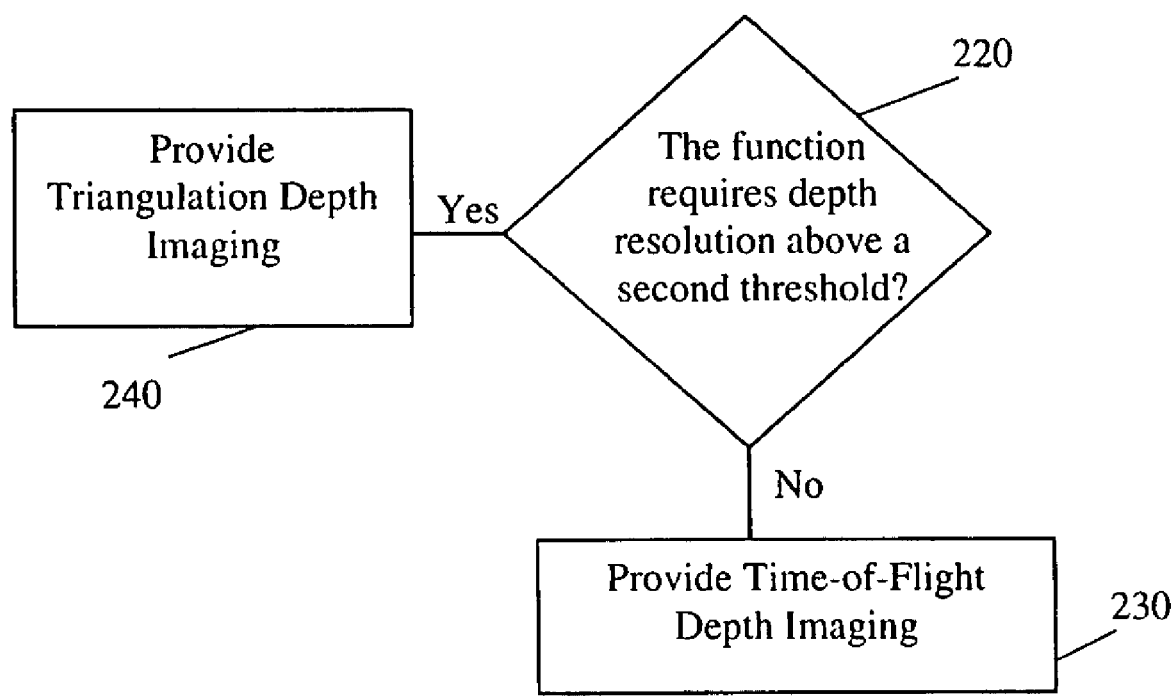
FIG. 4 is a flow chart illustrating a method for switching between two modes of a dual mode camera according to embodiments of the present invention.

Reference is now made to FIG. 4, which is a flow chart illustrating a method for switching between two modes of a dual mode camera according to embodiments of the present invention. As indicated in block 220, some functions may have high resolution requirements for accurate depth imaging. Therefore, for example, it may be checked whether the function requires a depth resolution above a second threshold. For example, some systems may require accurate imaging for recognition of a user's face. Face recognition may be required for, e.g., systems which may provide personalized adjustment to a user, security and/or secured systems, computer/video games and the like. For example, a computer/video game may create a character based on three dimensional image of a user's face. Other applications may use accurate three dimensional imaging of objects, for example, for creation of computerized models or background scenery.

When the distance of the imaged objects from the camera is relatively large, the resolution differences between the two methods may be hardly recognizable by a user. As indicated in block 230, in these cases and in other cases when the function does not require a depth resolution above a second threshold, the camera may provide TOF depth sensing. TOF depth sensing may be preferred due to the speed of the TOF imaging.

As indicated in block 240, when the function requires depth resolution above a second threshold, and/or when a real-time imaging may not be required, the camera may provide triangulation depth sensing. According to some embodiments, the choice between TOF depth sensing and triangulation depth sensing may be made by a user which may switch between the imaging methods. For example, a combined depth imaging camera may provide a manual switching button (not shown in the drawings). In other embodiment, a user may switch between the methods by giving an order to a controller by a user interface.

According to other embodiments of the present invention, the choice between TOF depth sensing and triangulation depth sensing may be made by a processor/controller (as shown in FIG. 5A, 5B or 6), which may choose a depth sensing method according to a predefined threshold of required resolution, as described above with reference to FIG. 4.

It will be noted that the method described in FIG. 3 may be combined with the method described in FIG. 4. For example, a controller may check whether the distance of the sensed object from the camera is below a first threshold, and then whether the function requires a depth resolution above a second threshold, or vice versa, and choose a depth sensing method accordingly.

Reference is now made to FIGS. 5A and 5B, which are schematic illustrations of a system 300 for dual mode depth imaging according to some embodiments of the present invention. System 300 may include a radiation sensor 320 and a radiation source 330 which may be used, for example, for TOF depth imaging of an object 310, as described above with reference to FIG. 1. Additionally, system 300 may include a color sensor 340 which may sense, for example, color of object 310.

Radiation source 330 may produce a radiation wall 332, as described above with reference to FIG. 1. Radiation wall 332 may be emitted towards, for example, object 310. Reflected radiation 334 may be reflected back from object 310 towards radiation sensor 320. As described above with reference to FIG. 1, at a certain time radiation sensor 320 may be gated to cease absorbing the radiation reflected from object 310. The gating may be performed by physically blocking the radiation by, for example, a shutter (not shown). Alternatively, radiation sensor 320 may be predefined to stop absorbing radiation after a predetermined time. Until the gating time, radiation sensor 320 may absorb, for example, a front 336 of reflected radiation 334.

The depth of substantially each point on the front face of object 310 may be deduced from the amount of radiation reflected from the point and absorbed by radiation sensor 320 until the gating time.

Alternatively, the depth may be deduced from a phase shift of a modulated radiation reflected from object 310.

In some embodiments of the present invention, system 300 may provide a triangulation depth imaging. For example, color sensor 340 and radiation sensor 320 may be used for stereo passive triangulation, wherein, for example, a processor/controller 350 may provide the image matching. For example, the triangulation for depth imaging of a point 311 on object 310 may be based on combination of parameters from a list including, for example, the distance between color sensor 340 and radiation sensor 320, spatial angle of the Line of sight (LOS) 325 from point 311 to radiation sensor 320, spatial angle of the LOS 345 from point 311 to color sensor 340, the focal length of the cameras and other suitable parameters.

The correspondence between the images provided by color sensor 340 and radiation sensor 320 may be provided by processor/controller 350. In some embodiments, a light pattern which may be radiated on object 310 may facilitate the image matching.

Processor/controller 350 may choose between TOF depth imaging and triangulation depth imaging based on the distance of object 310 and/or the required resolution, as described, for example, with reference to FIGS. 3 and 4.

In other embodiments, the depth imaging system may be used for other kinds of triangulation. Reference is now made to FIG. 6, which is a schematic illustration of a system 400 for dual mode depth imaging according to some embodiments of the present invention. System 400 may include a radiation sensor 420, a radiation source 430, a color sensor 440 and a processor/controller 450, which may operate similarly to the corresponding elements which are described above with reference to FIGS. 5A and 5B. Additionally, system 400 may include, for example, a scanner 460 which may scan an object 410 angle by angle with a stripe of radiation 465. The triangulation calculation may base on the spatial angle of the LOS from the imaged object to the camera, for each scanning angle.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for dual mode depth imaging, the system comprising:
a first and second image sensors; and
a processor able to determine if a distance of a sensed object from said system is below a first threshold, wherein said first threshold is derived based on a dynamic depth sensing range associated with a first mode of depth imaging and a second mode of depth imaging; determine if a depth resolution above a second threshold is required by an application; and automatically switch between said first mode of depth imaging and said second mode of depth imaging in real time according to the first threshold, the depth resolution and the second threshold.

2. A system according to claim 1, wherein said processor is to activate said first and second image sensors in said first mode of depth imaging when the distance of the sensed object from said system is below said first threshold, and to activate said first and second image sensors in said second mode of depth imaging when the distance of said sensed object from said system is above said first threshold.

3. A system according to claim 1, wherein said first image sensor is to provide said second mode of depth imaging according to Time-of-Flight of pulsed radiation reflected from an imaged object.

4. A system according to claim 1, wherein said second image sensor is to sense color of an imaged object.

5. A system according to claim 1, wherein said first mode of depth imaging includes calculation of distances by triangulation based on geometrical parameters derived from at least one of the first and second image sensors.

6. A system according to claim 1, wherein said second mode of depth imaging includes calculation of distances according to Time-of-Flight of pulsed radiation reflected from an imaged object.

7. A system according to claim 1, wherein said processor is further to activate said first and second image sensors in said first mode of depth imaging when said depth resolution above said second threshold is required.

8. A system according to claim 1, wherein said first image sensor is black and white sensor.

9. A system according to claim 2, wherein the value of said first threshold is approximately several tens of centimeters.

10. A system according to claim 1, wherein said processor is to switch between said first mode of depth imaging and said second mode of depth imaging when the distance of the sensed object from said system exceeds said first threshold, and to switch between said second mode of depth imaging and said first mode of depth imaging when the distance of the sensed object from said system decreases below said first threshold.

11. A system according to claim 1, wherein the dynamic depth sensing range of said first mode of depth imaging is substantially from a few centimeters to several tens of centimeters.

12. A system according to claim 1, wherein the dynamic depth sensing range of said second mode of depth imaging is substantially from several tens of centimeters to a few meters.

13. A system according to claim 6, further including a radiation source.

14. A system according to claim 5, wherein said processor is further to match the images received from the first and second image sensors.

15. A method for dual mode depth imaging, the method comprising:
checking distance of a sensed object from a camera to conclude whether said distance is below a first threshold, wherein said distance is derived based on a dynamic depth sensing range associated with depth sensing by Time of Flight and depth sensing by triangulation;
checking whether a depth resolution above a second threshold is required by an application;
automatically switching between said depth sensing by Time of Flight and said depth sensing by triangulation in real time based on the first threshold, the second threshold and the depth resolution, said automatically switching comprising:
providing said depth sensing by Time of Flight, if the distance of the sensed object from the camera is not below said first threshold and if the depth resolution above a second threshold is not required; and
providing said depth sensing by triangulation, if the distance of the sensed object from the camera is below said first threshold and if the depth resolution above the second threshold is required.

16. One or more processor readable storage devices having processor readable code embodied on said one or more processor readable storage devices, the processor readable code for programming one or more processors to perform a method comprising:
checking distance of a sensed object from a camera to conclude whether said distance is below a first threshold, wherein said distance is derived based on a dynamic depth sensing range associated with a first mode of depth imaging and a second mode of depth imaging;
checking whether a depth resolution above a second threshold is required by an application;
automatically switching between said first mode of depth imaging and said second mode of depth imaging in real time based on the first threshold, the second threshold and the depth resolution, said automatically switching comprising:
providing said depth sensing by said first mode of imaging, if the distance of the sensed object from the camera is not below said first threshold and if the depth resolution above a second threshold is not required; and
providing said depth sensing by said second mode of imaging, if the distance of the sensed object from the camera is below said first threshold and if the depth resolution above the second threshold is required.

* * * * *